United States Patent
Shao et al.

(10) Patent No.: US 12,007,251 B2
(45) Date of Patent: Jun. 11, 2024

(54) METHODS AND INTERNET OF THINGS (IOT) SYSTEMS FOR DIAGNOSING ACCURACY OF SMART GAS ULTRASONIC METERS

(71) Applicant: CHENGDU QINCHUAN IOT TECHNOLOGY CO., LTD., Sichuan (CN)

(72) Inventors: Zehua Shao, Chengdu (CN); Junyan Zhou, Chengdu (CN); Bin Liu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/360,787

(22) Filed: Jul. 27, 2023

(65) Prior Publication Data

US 2023/0366706 A1    Nov. 16, 2023

(30) Foreign Application Priority Data

Jun. 26, 2023    (CN) .......................... 202310755091.9

(51) Int. Cl.
*G06F 11/30* (2006.01)
*G01D 18/00* (2006.01)
(Continued)

(52) U.S. Cl.
CPC ............ *G01D 18/00* (2013.01); *G16Y 10/35* (2020.01); *G16Y 40/10* (2020.01); *G16Y 40/20* (2020.01)

(58) Field of Classification Search
CPC ..................................................... G01D 18/00
See application file for complete search history.

(56) References Cited

U.S. PATENT DOCUMENTS

2023/0079768 A1*    3/2023    Shao ...................... G06Q 50/06
137/551

FOREIGN PATENT DOCUMENTS

| CN | 103001328 A | 3/2013 |
|----|-------------|--------|
| CN | 107977672 A | 5/2018 |

(Continued)

OTHER PUBLICATIONS

Notification to Grant Patent Right for Invention in Chinese Application No. 202310755091.9 dated Oct. 26, 2023, 7 pages.

*Primary Examiner* — Phuong Huynh
(74) *Attorney, Agent, or Firm* — METIS IP LLC

(57) ABSTRACT

Embodiments of the present disclosure provide a method and an Internet of Things (IoT) system for diagnosing accuracy of a smart gas ultrasonic meter. The method is implemented by a smart gas device management platform of the IoT system for diagnosing accuracy of the smart gas ultrasonic meter. The method includes: acquiring gas attribute data of gas passing through a metering device based on a distributed sensor deployed in a gas pipeline network; determining a first accuracy risk of the metering device through performing pre-diagnosis on the metering device based on the gas attribute data and metering device information; determining a second accuracy risk of the metering device through performing precision diagnosis on the metering device based on a pre-diagnosis result; and displaying detection indication information to the smart gas device management platform based on a precision diagnosis result.

4 Claims, 4 Drawing Sheets

(51) Int. Cl.
*G16Y 10/35* (2020.01)
*G16Y 40/10* (2020.01)
*G16Y 40/20* (2020.01)

(56) References Cited

FOREIGN PATENT DOCUMENTS

| | | | |
|---|---|---|---|
| CN | 111260232 | A | 6/2020 |
| CN | 112149877 | A | 12/2020 |
| CN | 112185011 | A | 1/2021 |
| CN | 113091872 | A | 7/2021 |
| CN | 115166414 | A | 10/2022 |
| CN | 115358432 | A | 11/2022 |
| CN | 115496625 | A | 12/2022 |
| CN | 115618746 | A | 1/2023 |
| CN | 115640914 | A | 1/2023 |
| CN | 116070771 | * | 5/2023 |
| CN | 116070771 | A | 5/2023 |
| CN | 116086814 | A | 5/2023 |
| CN | 116244443 | * | 6/2023 |
| CN | 116244443 | A | 6/2023 |
| CN | 116258086 | A | 6/2023 |
| EP | 2924644 | A1 | 9/2015 |
| WO | 2023109370 | A1 | 6/2023 |

* cited by examiner

METHODS AND INTERNET OF THINGS (IOT) SYSTEMS FOR DIAGNOSING ACCURACY OF SMART GAS ULTRASONIC METERS

CROSS-REFERENCE TO RELATED APPLICATIONS

This application claims the priority of the Chinese Patent Application No. 202310755091.9, filed on Jun. 26, 2023, the entire contents of which are incorporated herein by reference.

TECHNICAL FIELD

The present disclosure relates to a field of Internet of Things, and in particular to a method and an Internet of Things (IoT) system for diagnosing accuracy of a smart gas ultrasonic meter.

BACKGROUND

With the development of ultrasonic fluid measurement technology, ultrasonic flow meters, ultrasonic gas meters, and other ultrasonic meters are gradually applied to measure gas pipeline networks. However, problems with metering accuracy of ultrasonic meters are inevitable during transporting gas in the gas pipeline network. In order to reduce occurrences of situations where metering accuracy of ultrasonic meters does not meet requirements, current solutions mainly involve regular on-site inspections and maintenance on ultrasonic meters, which not only requires a large amount of work, but also fails to promptly identify and address the problem that metering accuracy of the ultrasonic meters does not meet the requirements.

Therefore, it is desirable to provide a method and an Internet of Things (IoT) system for diagnosing accuracy of a smart gas ultrasonic meter to reduce occurrences of situations where the metering accuracy of ultrasonic meters does not meet the requirements and promptly identify problems, thereby effectively ensuring stable operation of the gas pipeline network.

SUMMARY

One or more embodiments of the present disclosure provide a method for diagnosing accuracy of a smart gas ultrasonic meter, wherein the method is implemented by a smart gas device management platform of an Internet of Things (IoT) system for diagnosing accuracy of the smart gas ultrasonic meter, and the method includes: acquiring gas attribute data of gas passing through a metering device based on a distributed sensor deployed in a gas pipeline network; determining a first accuracy risk of the metering device through performing pre-diagnosis on the metering device based on the gas attribute data and metering device information; determining a second accuracy risk of the metering device through performing precision diagnosis on the metering device based on a pre-diagnosis result; and displaying detection indication information to the smart gas device management platform based on a precision diagnosis result.

One or more embodiments of the present disclosure provide an Internet of Things (IoT) system for diagnosing accuracy of a smart gas ultrasonic meter, wherein the system comprises a smart gas user platform, a smart gas service platform, a smart gas device management platform, a smart gas sensing network platform, and a smart gas object platform. The smart gas user platform includes a plurality of smart gas user sub-platforms. The smart gas service platform includes a plurality of smart gas service sub-platforms. The smart gas device management platform includes a plurality of smart gas device management sub-platforms and a smart gas data center. The smart gas sensing network platform is configured to interact with the smart gas data center and the smart gas object platform. The smart gas object platform is configured to acquire gas attribute data of gas passing through a metering device based on a distributed sensor deployed in a gas pipeline network. The smart gas device management platform is configured to: determine a first accuracy risk of the metering device through performing pre-diagnosis on the metering device based on the gas attribute data and metering device information, determine a second accuracy risk of the metering device through performing precision diagnosis on the metering device based on a pre-diagnosis result, display detection indication information to the smart gas device management platform based on a precision diagnosis result, and transmit the detection indication information to the smart gas service platform through the smart gas data center. The smart gas service platform is configured to upload the detection indication information to the smart gas user platform.

One or more embodiments of the present disclosure provide a non-transitory computer-readable storage medium, wherein the storage medium stores computer instructions, and when a computer reads the computer instructions in the storage medium, the computer implements the method for diagnosing accuracy of the smart gas ultrasonic meter described above.

BRIEF DESCRIPTION OF THE DRAWINGS

The present disclosure will be further illustrated by way of exemplary embodiments, which will be described in detail by way of the accompanying drawings. These embodiments are not restrictive, in which the same numbering indicates the same structure, wherein.

DETAILED DESCRIPTION

Figure 1:
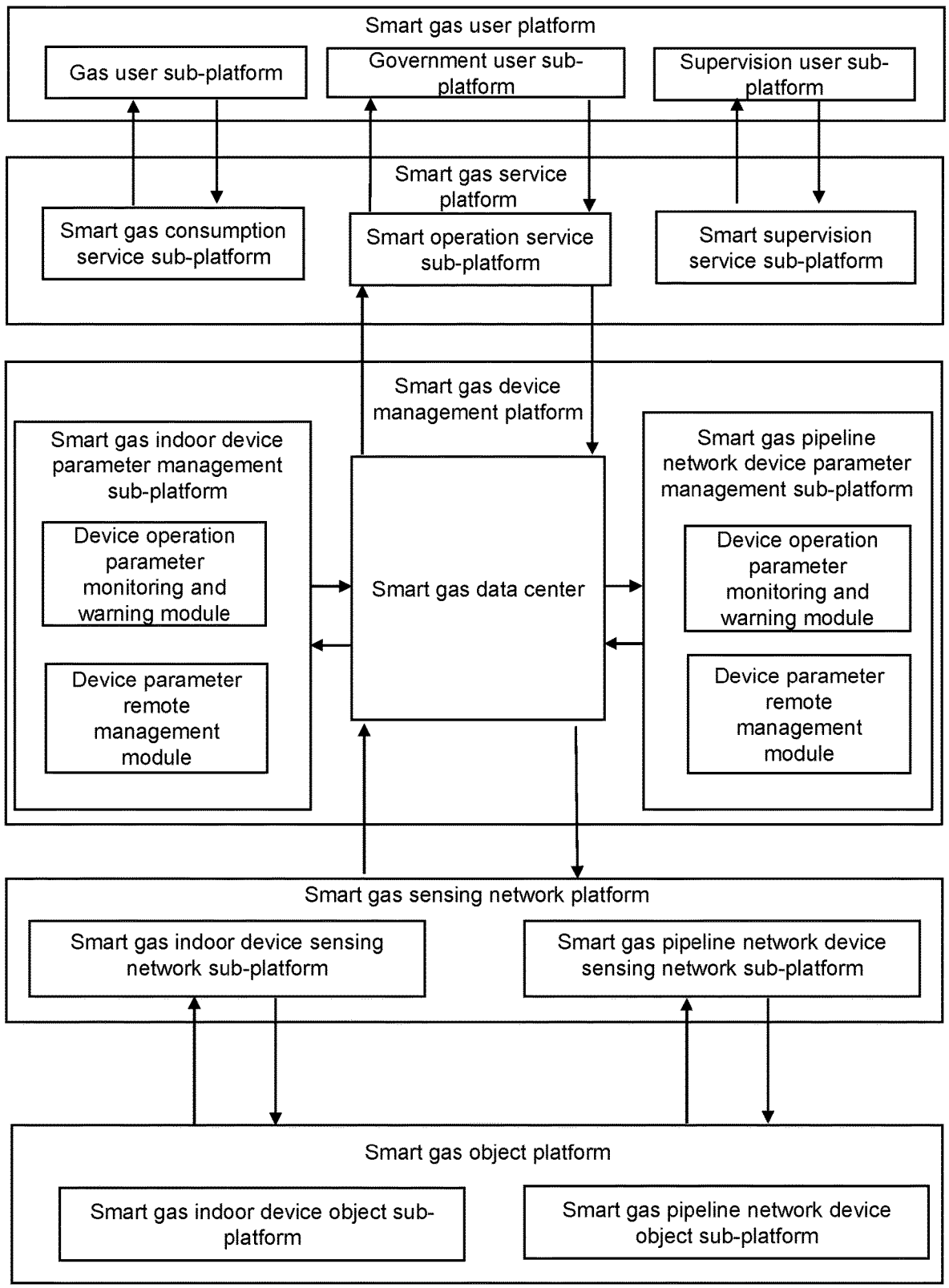
FIG. 1 is a schematic diagram illustrating structures of platforms of an Internet of Things (IoT) system for diagnosing accuracy of a smart gas ultrasonic meter according to some embodiments of the present disclosure.

In order to more clearly illustrate the technical solutions of the embodiments of the present disclosure, the following will be a brief description of the accompanying drawings that need to be used in the description of the embodiments. Obviously, the accompanying drawings in the following description are only examples or embodiments of the present disclosure, and other similar scenarios may be applied to the present disclosure by those of ordinary skill in the art, without creative effort. Unless obviously obtained from the context or the context illustrates otherwise, the same numeral in the drawings refers to the same structure or operation.

Flowcharts are used throughout the present disclosure to illustrate operations performed by the system according to embodiments of the present disclosure. It should be understood that the preceding or following operations are not necessarily performed in exact order. Instead, various operations may be processed in reverse order or simultaneously. Meanwhile, other operations may also be added to these processes, or a certain step or several steps may be removed from these processes.

Environmental conditions and gas transportation situations vary in different gas pipeline network areas, and the possibility and the time that the metering accuracy of gas metering device does not meet requirements are also different. In order to efficiently ensure that the metering accuracy of the gas metering devices meets the requirements, when assigning maintenance personnel to inspect the gas metering devices in different areas of a gas pipeline network, it is necessary to consider the possibility of the metering accuracy of the gas metering devices in different areas not meeting the requirements. Thus, some embodiments of the present disclosure acquire gas attribute data of gas passing through a metering device based on a distributed sensor deployed in the gas pipeline network, determine a first accuracy risk and a second accuracy risk of the metering device based on the gas attribute data and the metering device information, and promptly identify and address issues where the metering accuracy of gas metering devices fails to meet the requirements, so as to ensure stable and safe operation of the gas pipeline network.

FIG. 1 is a schematic diagram illustrating structures of platforms of an Internet of Things (IoT) system for diagnosing accuracy of a smart gas ultrasonic meter according to some embodiments of the present disclosure.

As shown in FIG. 1, the IoT system 100 for diagnosing accuracy of the smart gas ultrasonic meter may include a smart gas user platform, a smart gas service platform, a smart gas device management platform, a smart gas sensing network platform, and a smart gas object platform.

The smart gas user platform may be a platform configured to interact with users. The smart gas user platform may be configured as a terminal device.

The smart gas user platform may include a plurality of smart gas user sub-platforms, for example, a gas user sub-platform, a government user sub-platform, and a supervision user sub-platform.

The smart gas user platform may send information such as metering device information and gas attribute data to users based on the gas user sub-platform. Details about the metering device information and the gas attribute data may be found in FIG. 2 and its related contents.

The smart gas service platform refers to a platform for receiving and transmitting data and/or information such as advisory information, inquiry instructions, troubleshooting solutions, etc. The smart gas service platform may include a plurality of smart gas service sub-platforms, for example, a smart gas consumption service sub-platform, a smart operation service sub-platform, and a smart supervision service sub-platform. Different smart gas service sub-platforms correspond to and interact with different smart gas user sub-platforms. The smart gas user sub-platform may obtain safe gas consumption services through information related to a gas device provided by the smart gas consumption service sub-platform. The government user sub-platform may obtain gas operation services through information related to gas operation provided by the smart operation service sub-platform. The supervision user sub-platform may obtain safe supervision need services through information related to safety supervision provided by the smart supervision service sub-platform.

The smart gas service platform may receive detection indication information and upload the detection indication information to the smart gas user platform based on the smart operation service sub-platform. Details of the detection indication information may be found in FIG. 2 and its associated contents.

The smart gas device management platform refers to a platform that overall plans and coordinates connections and collaborations among various functional platforms, converges all information of the IoT system, and provides perception management and control management functions for operations of the IoT system. The smart gas device management platform may include a smart gas data center and a plurality of smart gas device management sub-platforms, for example, a smart gas indoor device parameter management sub-platform and a smart gas pipeline network device parameter management sub-platform.

The smart gas indoor device parameter management sub-platform may include a device operation parameter monitoring and warning module and a device parameter remote management module. The smart gas pipeline network device parameter management sub-platform may include a device operation parameter monitoring and warning module and a device parameter remote management module.

The smart gas device management platform may acquire gas attribute data and determine a first accuracy risk of the metering device through performing pre-diagnosis on the metering device based on the gas attribute data and metering device information; determine a second accuracy risk of the metering device through performing precision diagnosis on the metering device based on a pre-diagnosis result; display detection indication information to the smart gas device management platform based on a precision diagnosis result; and transmit the detection indication information to the smart gas service platform through the smart gas data center. Details of the smart gas device management platform may be found in FIG. 2 and its related contents.

The smart gas device management platform may interact with the smart gas service platform and the smart gas sensing network platform respectively through the smart gas data center. In some embodiments, the smart gas data center may send instructions to the smart gas sensing network platform to obtain relevant data of a gas device and receive relevant data of the gas device uploaded by the smart gas sensing network platform.

The smart gas sensor network platform may be a functional platform for managing sensor communication. In some embodiments, the smart gas sensing network platform may perform functions of sensing information sensing communication and control information sensing communication. The smart gas sensing network platform is configured as a communication network and a gateway for interaction with the smart gas data center and the smart gas object platform.

The smart gas sensing network platform may include a smart gas indoor device sensing network sub-platform and a smart gas pipeline network device sensing network sub-platform for obtaining relevant data of an indoor device and a pipeline network device, respectively.

The smart gas object platform may be a functional platform for sensing information generation and controlling information execution. The smart gas object platform may acquire gas attribute data of gas passing through a metering device based on a distributed sensor deployed in a gas pipeline network and upload the gas attribute data to the smart gas data center through the smart gas sensing network platform.

The smart gas object platform may include a smart gas indoor device object sub-platform and a smart gas pipeline network device object sub-platform. In some embodiments, the smart gas indoor device object sub-platform may be configured as various types of gas indoor devices for gas users. In some embodiments, the smart gas pipeline network device object sub-platform may be configured as various types of gas pipeline network devices and monitoring devices.

The IoT system 100 for diagnosing accuracy of smart gas ultrasonic meter may form a closed loop of information operation between the smart gas object platform and the smart gas user platform, and operate in a coordinated and regular manner under unified management of the smart gas device management platform to realize digitized and smart management of metering devices.

Figure 2:
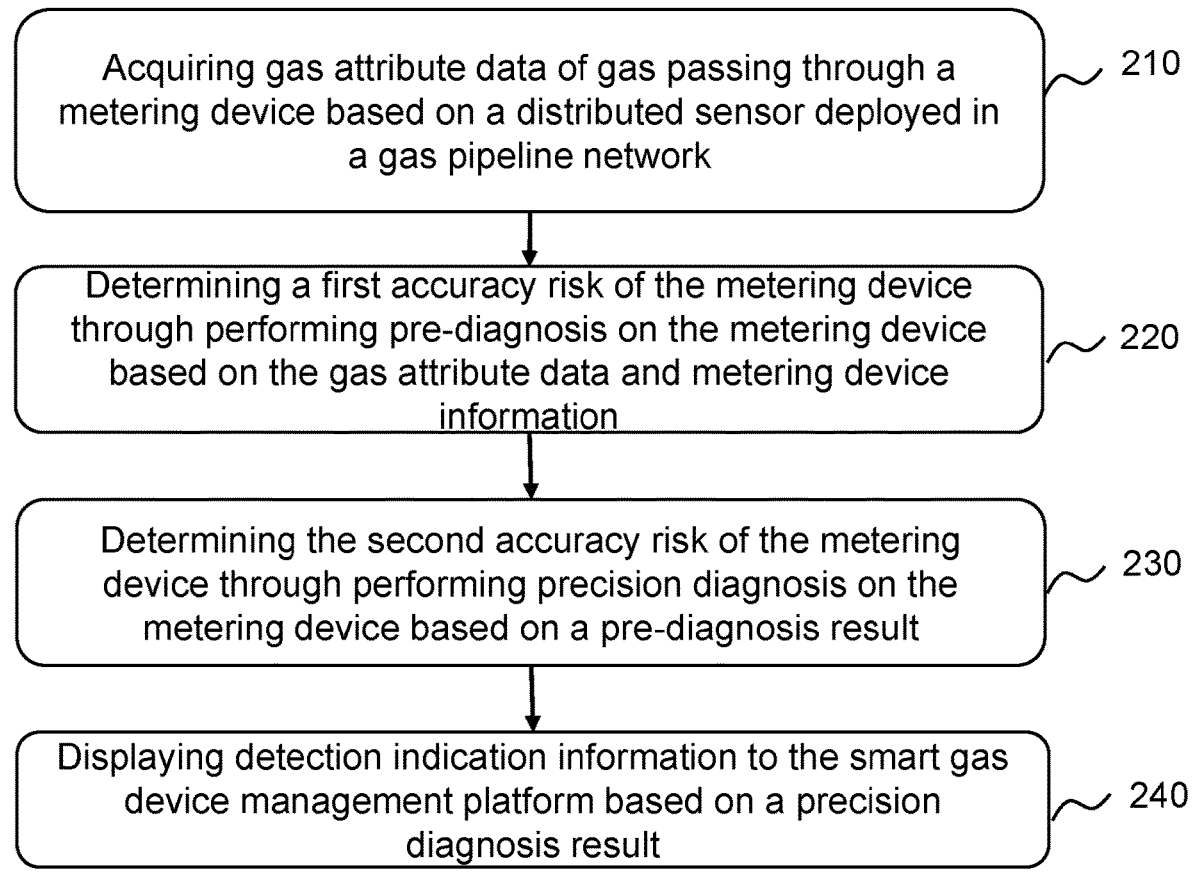
FIG. 2 is an exemplary flowchart illustrating a method for diagnosing accuracy of a smart gas ultrasonic meter according to some embodiments of the present disclosure.

FIG. 2 is an exemplary flowchart illustrating a method for diagnosing accuracy of a smart gas ultrasonic meter according to some embodiments of the present disclosure. A process 200 may be executed by a smart gas device management platform.

Step 210, acquiring gas attribute data of gas passing through a metering device based on a distributed sensor deployed in a gas pipeline network.

The distributed sensor may be a device configured to obtain gas-related data. The distributed sensor may include at least a density sensor, a composition sensor, etc. The distributed sensors may be deployed at various locations in the gas pipeline network in a distributed manner with locations of a plurality of metering devices, or deployed at a plurality of preset locations in a distributed manner, etc. For example, the distributed sensors may be deployed at various pipeline interfaces, etc.

The metering device may be a device configured to measure a flow of natural gas, for example, an ultrasonic meter, etc. The gas attribute data may refer to gas-related data. The gas attribute data may include density, composition and mass, fluid pulsation, flow rate profile, etc., of the gas.

The gas attribute data may be obtained through the distributed sensors. For example, a smart gas device management platform may acquire the density, the composition, and the mass of the gas passing through a plurality of metering devices through the density sensors and the composition sensors deployed at different locations, respectively. In some embodiments, the mass of the gas may be determined based on an analysis of composition data from the composition sensor. For example, the smart gas device management platform may determine the mass of the gas based on mass and a percentage of different components in the gas. A volume percentage of the different components in the gas is used as a weight, and a weighted mass is obtained by combining molecular mass, and the weighted mass of the different components is added to obtain the mass of the gas. In some embodiments, the fluid pulsation and the flow rate profile may be determined by transmitters and receivers deployed at different locations. For example, the fluid pulsation and the flow rate profile are calculated based on data measured by the transmitters and the receivers.

Step 220, determining a first accuracy risk of the metering device through performing pre-diagnosis on the metering device based on the gas attribute data and metering device information.

The metering device information is data related to the metering device. The metering device information may include information about a type, a service life, a location, etc. The smart gas device management platform may acquire pre-stored metering device information through the smart gas data center. In some embodiments, the metering device information may also include external factors affecting the metering device, such as ambient temperatures, acoustic and electromagnetic noises, contaminants, etc. The smart gas device management platform may acquire information on the ambient temperatures, the acoustic and electromagnetic noises, the contaminants, etc. through corresponding test devices.

The first accuracy risk is pre-diagnosed possible abnormal metering device and its abnormal possibility. The first accuracy risk may be expressed as a number, the larger the number, the greater the abnormal possibility of the metering device, and the higher the first accuracy risk.

The pre-diagnosis may preliminarily screen out the possible abnormal metering device. The smart gas device management platform may screen out the metering devices based on the metering device information and fluctuation of the gas attribute data. The measuring device whose service life and the harshness of the environmental condition exceed an abnormality threshold is considered as a possible abnormal measuring device. The abnormality threshold may be determined empirically. The longer the service life and the hasher the environment condition of the metering device, the higher the abnormal possibility of the metering device.

In some embodiments, the smart gas device management platform may determine the first accuracy risk based on the metering device information and the fluctuation of the gas attribute data. The fluctuation of the gas attribute data may include a difference of the gas attribute data for a plurality of moments at a same point, and a difference of the gas attribute data for a same moment at a plurality of points, and the plurality of points may be a plurality of points in a same gas pipeline.

The greater the difference of the gas attribute data, the greater the fluctuation of the gas attribute data. The smart gas device management platform may determine the first accuracy risk based on the fluctuation of the gas attribute data, the metering device information, and a first preset table. The first preset table may be a table showing a preset correspondence among the fluctuation of the gas attribute data, the metering device information, and the first accuracy risk. The first preset table may be preset by the system or by manual experience. For example, for the metering device with a longer service life, a more complex location environment, and larger fluctuation of the gas attribute data in the metering device information, the abnormal possibility of the metering device is higher, and the corresponding first accuracy risk is higher.

In some embodiments, the smart gas device management platform may predict a predicted gas flow of at least one point in a gas pipeline in a future period based on historical gas monitoring data, and determine a suspect metering device based on the predicted gas flow and gas monitoring data of the metering device. Further, the smart gas device management platform may evaluate the first accuracy risk of the suspect metering device based on the gas attribute data and the metering device information.

The point is a location in the gas pipeline where the metering device is deployed. The point may include one or more points in a same section of the gas pipeline. The points may be provided with sensors and other devices.

The predicted gas flow is a probable gas flow of at least one point in a gas pipeline in a future period. The predicted gas flow may be predicted through a rolling prediction. The rolling prediction refers to continuously predicting the gas flow of each point in the future periods. For example, at 9:00, the gas flow in the period of 10:00-11:00 is predicted; and at 10:00, the gas flow in the period of 11:00-12:00 is further predicted. The predicted gas flow of each point may be predicted individually, not all points at the same time. In this way, the smart gas device management platform may predict one or more points based on actual demand, rather than all points, thereby improving prediction efficiency and reducing computing load on the system.

The historical gas monitoring data is a gas flow of gas through the metering device over a historical period prior to a current moment. In some embodiments, the smart gas device management platform may predict the predicted gas flow based on historical gas monitoring data through a second preset table characterizing a correspondence between the predicted gas flow and the historical gas monitoring data. The second preset table may be preset based on historical data or manual experience.

In some embodiments, the smart gas device management platform may generate a historical flow data sequence based on the historical gas monitoring data, and predict, based on the historical flow data sequence, the predicted gas flow in the future period through a flow prediction model.

The historical flow data sequence may refer to a sequence composed by the historical gas monitoring data. The historical flow data sequence may include at least one of time information, a gas flow, and a count of gas users, etc. For example, the historical flow data sequence may be represented by $\{(a, b, c), (d, e, f), \ldots\}$, where a and d are the time information, b and e are the gas flows at corresponding times, and c and f are information such as the count of gas users corresponding to the gas pipeline at the corresponding times. Based on the smart gas data center, the smart gas device management platform may acquire information such as the gas flow of the metering device of the smart gas object platform at different times and the count of gas users corresponding to the gas pipeline through the smart gas sensing network platform.

The flow prediction model may refer to a model configured to predict the predicted gas flow for future periods. The flow prediction model may include various types of models. For example, the flow prediction model may be a machine learning model, such as Long-Short Term Memory (LSTM), etc.

In some embodiments, the flow prediction model may be obtained by training a plurality of first training samples with a first label.

In some embodiments, the first training sample may include at least a historical flow data sequence of a sample first historical time. The first label may be an actual gas flow corresponding to a second historical time. The second historical time is after the first historical time and is a future period of the first historical time. The first label may be determined based on historical data or manual annotation.

Based on the historical flow data sequence, the flow prediction model is used to determine the predicted gas flow, which can improve accuracy of the predicted gas flow.

The gas monitoring data is the gas flow passing through the metering device. The suspect metering device is the metering device that may have abnormalities.

In some embodiments, the smart gas device management platform may compare the predicted gas flow with the gas monitoring data of the metering device, and determine the metering device with data differences greater than a difference threshold for a plurality of consecutive times as the suspect metering device. The difference threshold and the count of times may be set based on manual experience or actual demand.

In some embodiments, the smart gas device management platform may determine the suspect metering device based on the estimated gas flow and change in the gas monitoring data of the metering device over a plurality of consecutive future periods.

The change over a plurality of consecutive future periods is changing trends of the predicted gas flow and the gas monitoring data of the metering device over a plurality of future periods. When the difference between the predicted gas flow and the gas monitoring data of the metering device exceeds the difference threshold in the plurality of consecutive future periods, and the difference is gradually increasing over time, the accuracy of the metering device is likely to be gradually decreasing, and the metering device may be determined as the suspect metering device. The difference threshold may be determined based on manual experience.

The suspect metering device is determined according to the changes between the predicted gas flow and the gas monitoring data of the metering device in the plurality of consecutive future periods, which takes into account the changes for the plurality of consecutive future periods, reducing a potential misjudgment based on changes in a single future period and further improving the accuracy of determining the suspect metering device.

In some embodiments, the smart gas device management platform may construct a first vector database based on historical data. The first vector database is a database that may be configured to store, analyze, and retrieve vectors. The first vector database may include a plurality of reference vectors. Each reference vector characterizes the historical metering device information and the historical gas attribute data for a metering device.

The smart gas device management platform may construct a feature vector for characterizing current metering device information and gas attribute data, compare a similarity of the reference vector and the feature vector, and determine one or more similar vectors with the similarity greater than a similarity threshold. The smart gas device management platform may determine a percentage of abnormal metering devices in one or more similar vectors. The smart gas device management platform may determine the first accuracy risk through a third preset table based on the similarity of the similar vectors corresponding to the feature vectors and the percentage of abnormal metering devices in the similar vectors. The third preset table may characterize a correspondence between the percentage, the similarity of the similar vectors, and the first accuracy risk. The third preset table may be determined based on manual experience.

Figure 3:
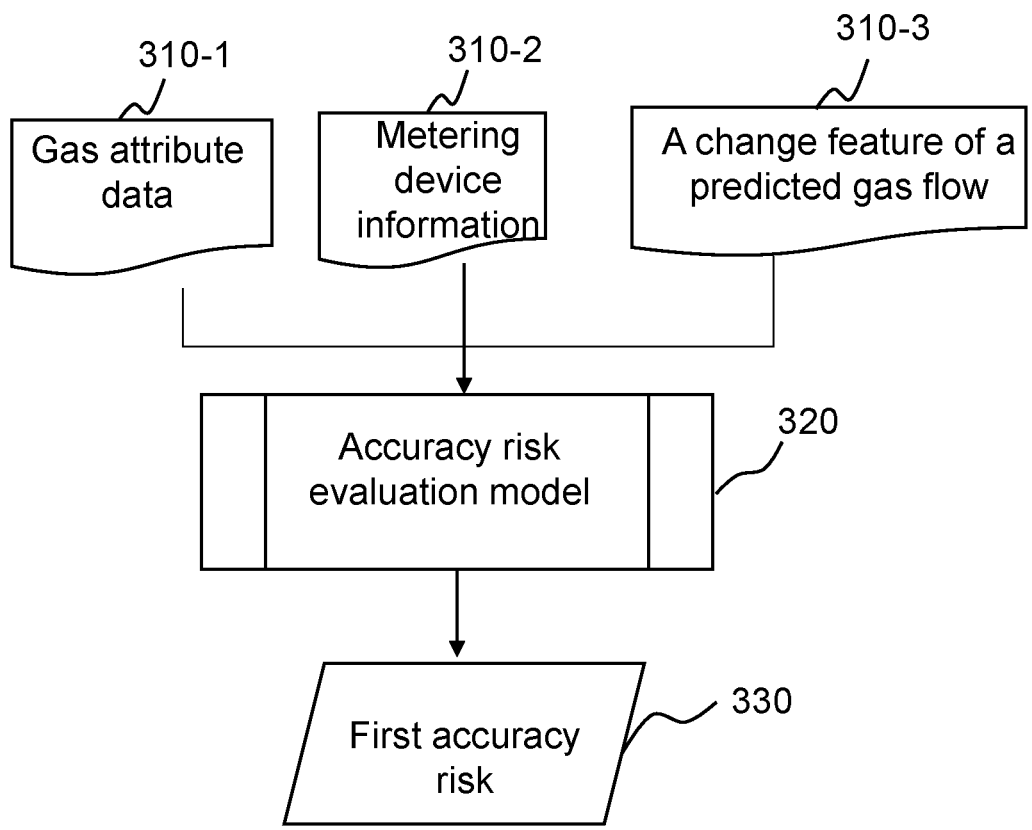
FIG. 3 is an exemplary schematic diagram illustrating an accuracy risk evaluation model according to some embodiments of the present disclosure.

In some embodiments, the smart gas device management platform may evaluate the first accuracy risk of the suspect metering device through an accuracy risk evaluation model based on the gas attribute data, the metering device information, and a change feature of the predicted gas flow, more details may be found in FIG. 3 and its related content.

Based on the historical gas monitoring data, the smart gas device management platform may predict the predicted gas flow of at least one point in the future period, determine the suspect metering device based on the predicted gas flow and the historical gas monitoring data, and further evaluate the first accuracy risk of the suspect metering device, which improves the accuracy of determining the suspect metering device and its corresponding first accuracy risk, and helps improve accuracy of subsequent determination of a second accuracy risk, which in turn guarantee the accuracy of the metering device in use and enhancing gas usage safety.

Step 230, determining the second accuracy risk of the metering device through performing precision diagnosis on the metering device based on a pre-diagnosis result.

The pre-diagnosis result may include the possible abnormal metering device and the first accuracy risk, etc.

The precision diagnosis is a process of further diagnosing the possible abnormal metering device to determine a possibility of an accuracy abnormality of the possible abnormal metering device. A precision diagnosis result may include the possible abnormal metering device and the second accuracy risk.

The second accuracy risk is the possibility of accuracy abnormality of the possible abnormal metering device. The second accuracy risk may be expressed as a number; the larger the number, the higher the second accuracy risk.

In some embodiments, for a metering device with a high first accuracy risk in the pre-diagnosis, the smart gas device management platform may compare the current metering device information, etc. of the metering device with a set value and determine the possibility of the accuracy abnormality based on a difference between the current metering device information and the set value. For example, the greater the difference between the current metering device information and the set value, the greater the possibility of the accuracy abnormality of the metering device, and the higher the second accuracy risk. The current metering device information may refer to metering device information of the metering device during diagnosis. The set value may refer to metering device information of the metering device during normal operation, which is preset by the system.

In response to the first accuracy risk of the at least one metering device satisfying a preset risk condition, the smart gas device management platform may evaluate the second accuracy risk of the at least one metering device in the gas area based on the first accuracy risk and the gas monitoring data. Please refer to the above description in FIG. 2 for details regarding the gas monitoring data.

The preset risk condition may refer to a count of metering devices with the first accuracy risk exceeding a first risk threshold reaching a quantity alert value. The first risk threshold and quantity alert values may be determined based on manual experience.

In some embodiments, the first risk threshold for each metering device may be set separately, and the first risk threshold may be related to a data monitoring frequency of the metering device. The data monitoring frequency of the metering device may refer to a count of times of the gas flow being monitored by the metering device per unit of time. The higher the data monitoring frequency, the more frequently the metering device works, the more important the metering device in the gas pipeline network, and the lower the first risk threshold.

Determining the first risk threshold based on the data monitoring frequency may strengthen the supervision of metering devices with high data monitoring frequencies, and further evaluate, so as to prevent accuracy problems and affect the normal operation of a gas system.

The gas area refers to an area divided by a gas company according to gas operation and maintenance management needs. The gas area may be determined based on system presets.

In some embodiments, the smart gas device management platform may evaluate the second accuracy risk through a fourth preset table based on the first accuracy risk and the gas monitoring data. The fourth preset table includes a preset correspondence of the first accuracy risk and gas monitoring data with the second accuracy risk, and the fourth preset table may be determined based on manual experience or system presets.

Figure 4:
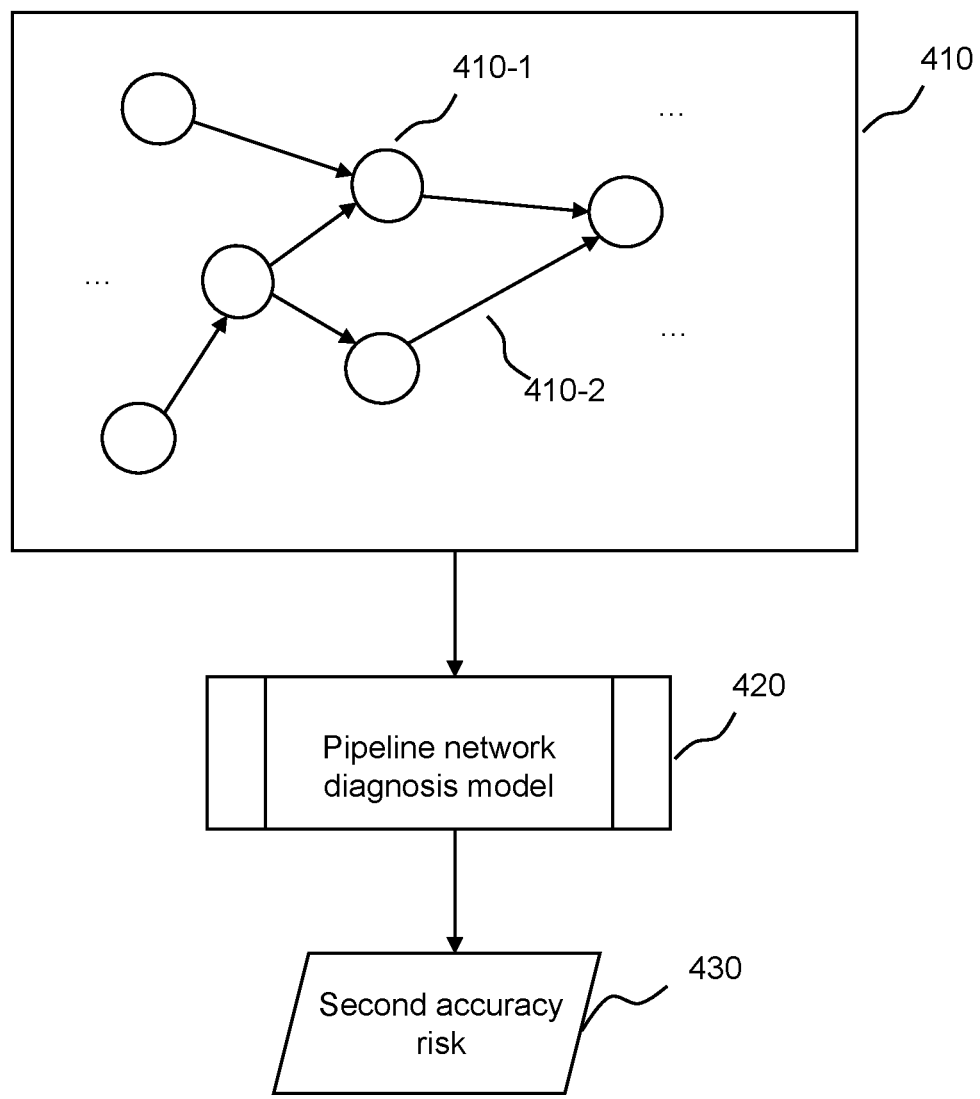
FIG. 4 is an exemplary schematic diagram illustrating a process of determining a second accuracy risk based on an accuracy diagnosis map according to some embodiments of the present disclosure.

In some embodiments, the smart gas device management platform may construct an accuracy diagnosis map based on the metering device in the gas area and determine, based on the accuracy diagnosis map, the second accuracy risk of the at least one of the metering devices in the gas area through a pipeline network diagnosis model, more details may be found in FIG. 4 and its related contents.

Based on the first accuracy risk and the gas monitoring data, evaluating the second accuracy risk of the metering device that satisfy conditions allows further evaluation of the accuracy risk of the metering device, improving accuracy of determining metering devices that require maintenance, and enhancing efficiency of detecting suspect metering devices and maintenance tasks by personnel.

Step 240, displaying detection indication information to the smart gas device management platform based on a precision diagnosis result.

Operations and maintenance users are personnel who maintain gas-related devices and equipment, for example, staff who maintain the metering devices.

The detection indication information is an indication of a detection of the metering device. The detection indication information may include a location, a quantity, other information, diagnosis operations (such as inspection, maintenance, replacement, etc.), and a diagnosis date of the measuring device with the second accuracy risk exceeding the risk threshold, The risk threshold is determined based on system presets or manual experience.

In some embodiments, the smart gas device management platform may communicate detection indication information to a smart gas user platform through a smart gas service platform, and maintenance personnel receives the detection indication information through the smart gas user platform.

The method for diagnosing accuracy of the smart gas ultrasonic meter integrates a variety of gas-related data and the metering device data to evaluate the metering device for a plurality of times, improving the accuracy and efficiency of determining abnormal metering devices, timely maintenance of the abnormal metering devices guarantees accuracy of the metering devices, reducing occurrences of metering accuracy not meeting requirements for the ultrasonic meter, and effectively ensuring stable operation of the gas pipeline network.

FIG. 3 is an exemplary schematic diagram illustrating an accuracy risk evaluation model according to some embodiments of the present disclosure.

In some embodiments, a smart gas device management platform may evaluate a first accuracy risk 330 of a suspect metering device based on gas attribute data 310-1, metering device information 310-2, and a change feature 310-3 of a predicted gas flow through an accuracy risk evaluation model 320, which may be a machine learning model.

In some embodiments, a range of metering accuracy of a metering device and a possibility of metering accuracy not meeting requirements are related to the metering device information. For example, for metering devices of different types, with different service lives and at different locations, the range of the metering accuracy and the possibility of the metering accuracy not meeting the requirements are different.

In some embodiments, the possibility of the metering accuracy not meeting the requirements is related to the location of the metering device. For example, metering devices at different locations have different possibilities of the metering accuracy not meeting the requirements.

In some embodiments, the smart gas device management platform may acquire gas attribute data based on monitoring data of a smart gas object platform.

More descriptions of the gas attribute data, the metering device information, and the first accuracy risk may be found in FIG. 2 and related descriptions.

The change feature of the predicted gas flow is data information related to a change of the predicted gas flow. In some embodiments, the change feature may be used to characterize a change of a gas flow.

In some embodiments, the change feature of the predicted gas flow may include a difference of the predicted gas flow between adjacent time periods and a variance of the predicted gas flow over a plurality of future periods In some embodiments, the metering accuracy of the metering device is related to the change feature of the predicted gas flow. For example, the larger the difference of the predicted gas flow between adjacent time periods and the larger the variance of the predicted gas flow over a plurality of future periods, the faster the gas flow changes, i.e., a time interval at which the metering device meters the gas flow is not small enough to accurately meter the change of the gas flow at this time, resulting in a decrease in the metering accuracy of the metering device.

As another example, the larger the difference of the predicted gas flow between adjacent time periods and the larger the variance of the predicted gas flow over a plurality of future periods, the faster the gas flow changes, which may result in eddy currents and turbulence, leading to unstable gas flow and affecting the propagation of ultrasonic waves, thereby reducing the metering accuracy of the metering device.

The smart gas device management platform enables a more accurate evaluation of the first accuracy risk of the suspect metering device through the difference of the predicted gas flow between adjacent time periods and the variance of predicted gas flow over future periods, which facilitates subsequent determination of a second accuracy risk and further improve safety and reliability of a gas system.

In some embodiments, the accuracy risk evaluation model 320 may be a machine learning model or other neural network models, such as a Convolutional Neural Network (CNN) model, etc.

In some embodiments, the accuracy risk evaluation model 320 evaluate one suspect metering device at a time. By inputting the gas attribute data 310-1, the metering device information 310-2, and the change feature of the predicted gas flow 310-3 of a plurality of suspect metering devices into the accuracy risk evaluation model 320 for a plurality of times, the smart gas device management platform may determine the first accuracy risks of the plurality of suspect metering devices.

In some embodiments, the accuracy risk evaluation model may be obtained by training a second training sample with a large number of second labels.

In some embodiments, the second training sample includes sample metering device information of a sample metering device, sample gas attribute data, and a change feature of a sample actual gas flow. The second training sample may be obtained based on historical data. The second label is 0 or 1, where 0 indicates that the accuracy of the sample metering device is not problematic, and 1 indicates that the accuracy of the sample metering device is problematic. The second label may be automatically labeled and acquired based on historical data.

In some embodiments, an input of the accuracy risk evaluation model 320 also includes an allowable error of the suspect metering device, environmental data of the location of the suspect metering device, a cleaning time of a gas pipeline, and the second accuracy risk of the suspect metering device.

The second accuracy risk of the suspect metering device is a second accuracy risk corresponding to a last precision diagnosis. A more detailed description of the second accuracy risk may be found in FIG. 2.

The allowable error refers to a maximum metering error allowed by the suspect metering device. In some embodiments, the allowable error of the suspect metering device is related to a type and a grade of the suspect metering device. For example, the larger the gas flow in a pipeline, the greater the allowable error of the suspect metering device located on the pipeline.

In some embodiments, a probability of the metering accuracy of the suspect metering device not meeting the requirements is related to the allowable error of the suspect metering device. For example, the larger the allowable error of the suspect metering device, the less the situation of the metering accuracy of the suspect metering device not meeting the requirements, i.e., the less the probability of the metering accuracy of the suspect metering device not meeting the requirements.

In some embodiments, the allowable error of the suspect metering device may be obtained based on system presets or human presets.

The environmental data are data related to an environment in which the suspect metering device is located. For example, the environmental data may include an ambient temperature, an ambient noise, etc.

In some embodiments, the more frequently the ambient temperature changes, the greater the probability of the metering accuracy of the suspect metering device not meeting the requirements is.

In some embodiments, the higher the ambient noise, the greater the probability of the metering accuracy of the suspect metering device not meeting the requirements. For example, if the suspect metering device meters the gas flow through ultrasonic waves, the greater the ambient noise, the more likely it is to affect sending and receiving of the ultrasonic waves by the suspect metering device, resulting in the metering accuracy of the suspect metering device not meeting the requirements.

In some embodiments, the smart gas device management platform may acquire the environmental data of the location of the suspect metering device based on the monitoring data of the smart gas object platform. For example, the smart gas device management platform may acquire the environmental data of the location of the suspect metering device through a temperature sensor, a humidity sensor, etc.

The cleaning time is a time of last cleaning a gas pipeline closest to a current time point.

In some embodiments, the possibility of the metering accuracy of the suspect metering device not meeting the requirements is related to the cleaning time. For example, the closer the last cleaning time of gas pipeline to the current time point, the less sediment and dirt in the gas pipeline and the less the possibility of the metering accuracy of the suspect metering device not meeting the requirements.

In some embodiments, the smart gas device management platform may acquire the cleaning time of the gas pipeline based on an input to a mobile device by personnel.

In some embodiments, when the input of the accuracy risk evaluation model includes the allowable error of the suspect metering device, the environmental data at the location of the suspect metering device, the cleaning time of the gas pipeline, and the second accuracy risk of the suspect metering device, the second training sample may also include the allowable error of the sample metering device corresponding to the suspect metering device, the environmental data at the location of the sample metering device, the cleaning time of a sample gas pipeline, and the second accuracy risk of the sample metering device.

The smart gas device management platform improves the accuracy of the first accuracy risk evaluation by further using the allowable error of the suspect metering device, the environmental data, the cleaning time, and the second accuracy risk obtained from the last precision diagnosis as the input of the accuracy risk evaluation model, which facilitates subsequent determination of a current second accuracy risk of the suspect metering device and ensures safe and stable operation of a gas pipeline system.

By using the accuracy risk evaluation model to evaluate the first accuracy risk of the suspect metering device, the smart gas device management platform can more accurately evaluate the first accuracy risk of the suspect metering device, which is conducive to the subsequent determination of the second accuracy risk of the suspect metering device and timely and effective maintenance of the suspect metering device, thereby improving the stability and reliability of the entire gas pipeline system.

FIG. 4 is an exemplary schematic diagram illustrating a process of determining a second accuracy risk based on an accuracy diagnosis map according to some embodiments of the present disclosure.

As shown in FIG. 4, a smart gas device management platform may construct an accuracy diagnosis map 410 based on a metering device in a gas area, wherein nodes of the accuracy diagnosis map include a metering device (e.g., a metering device 410-1, etc.) and edges of the accuracy diagnosis map 410 include gas pipelines between the nodes (e.g., a gas pipeline 410-2, etc.). The smart gas device management platform may determine, based on the accuracy diagnosis map 410, a second accuracy risk 430 of at least one of the metering devices in the gas area through a pipeline network diagnosis model 420, the pipeline network diagnosis model 420 being a machine learning model.

The accuracy diagnosis map refers to a directed graph configured to represent a relationship between the metering devices in the gas area.

In some embodiments, the smart gas device management platform may use the accuracy diagnosis map to determine whether there is a problem with the metering accuracy of the metering device or whether the gas causes a problem with the metering accuracy of the metering device. For example, a plurality of metering devices are distributed at different locations in the gas area, and if only the metering value of individual metering devices is different than others, it is judged that there is a problem with metering accuracy of the metering devices; if the metering values of most of the metering devices are different, it is judged that the gas causes problems with the metering accuracy of the metering devices.

The accuracy diagnosis map may include the nodes and the edges.

In some embodiments, the edges may include gas pipelines between any nodes, and directions of the edges indicate directions of a gas flow in the pipelines. Attributes of the edges may include pipeline parameters. For example, the pipeline parameters may include materials of the pipelines, pipeline diameters and lengths of the pipelines, residual impurities in the pipelines, etc.

In some embodiments, the nodes may include all metering devices in the gas area, and attributes of the nodes may include types of the metering devices, locations of the nodes in a gas pipeline network, gas monitoring data, gas theoretical data, a first accuracy risk, flow rate monitoring data, pressure monitoring data, etc. A more detailed description of the gas monitoring data may be found in FIG. 2.

For example, if a higher-level node includes three lower-level nodes, the greater a frequency and magnitude of changes in the flow rate monitoring data and the pressure monitoring data of a lower-level node, the greater the fluctuation of the metering accuracy of the corresponding metering device of the lower-level node.

In some embodiments, the smart gas device management platform may determine more accurately and reasonably whether a node's metering device is experiencing accuracy problems based on the gas monitoring data and the gas theoretical data, as well as the flow rate monitoring data and the pressure monitoring data, obtained by the higher-level node in real time.

In some embodiments, the types of the metering device may include a turbine flow meter, an ultrasonic flow meter, a magnetic moment flow meter, etc.

In some embodiments, the locations of the nodes in the gas pipeline network may be expressed by coordinates of a pipeline system. For example, the coordinates of the pipeline system may be (a, b, c, x), where a is a main pipeline, b is a first-level branch below the main pipeline a, c is a second-level branch below the first-level branch b, and x is a distance from the metering device corresponding to the node to a starting point of the second-level branch c.

In some embodiments, the first accuracy risk may be used to label different nodes in the accuracy diagnosis map. For example, the label may be expressed as a value or a grade. The higher the first accuracy risk of the node, the higher the value and the grade of the label that the node is labeled, the greater a possibility of the metering accuracy of the metering device corresponding to the node not meeting requirements in the accuracy diagnosis map. A more detailed description of the first accuracy risk may be found in FIG. 2.

The gas theoretical data may be used to represent gas monitoring data of the node theoretically. For example, the gas theoretical data may be a sum of the gas monitoring data corresponding to a plurality of lower-level nodes. The plurality of lower-level nodes refers to the metering device on a lower-level pipeline where the gas flows. The flow rate monitoring data refers to data related to a flow rate of the gas passing through the metering device. For example, the flow rate monitoring data may include a real-time gas flow rate, a rate of change of the gas flow rate, an average gas flow rate, etc.

The pressure monitoring data refers to data related to pressure of the gas passing through the metering device. For example, the pressure monitoring data may include real-time gas pressure, a rate of change of the gas pressure, an average gas pressure, etc.

In some embodiments, the attributes of the node may also include a historical calibration record corresponding to the metering device.

The historical calibration record refers to a record of calibrations performed on the metering device during a historical time. For example, the historical calibration record may include a date of the calibration, a reason for the calibration, a frequency of the calibration, etc.

It is important to note that the higher the calibration frequency in the historical calibration record, the greater the metering error of the metering device, and the greater the possibility of the metering accuracy of the metering device not meeting the requirements. The metering error of the metering device may refer to a difference between the metering value of the metering device and a preset value.

By using the historical calibration record of the metering device as an attribute of the node, an actual working condition and historical performance of the metering device may be more accurately reflected, enabling a more comprehensive consideration of maintenance of the metering device when evaluating the accuracy risk of the metering device, which helps to improve the accuracy of the evaluation.

The smart gas device management platform may construct an accuracy diagnosis map based on the metering devices in the gas area. For example, the smart gas device management platform may determine the location and connection relationships of the nodes (the metering devices) in the accuracy diagnosis map based on the topology in the gas area, and construct the edges between each node based on actual connection relationships between the metering devices (i.e., gas flow paths), and use graphical tools or programming languages (e.g., a networkx library in Python) to combine these nodes and edges to form a visualized accuracy diagnosis map.

In some embodiments, the smart gas device management platform may acquire the attributes of the nodes and the attributes of the edges in different ways. For example, a smart gas device management platform may acquire the attributes of the nodes and the attributes of the edges from device manufacturers. As another example, the smart gas device management platform may acquire the attributes of the nodes and the attributes of the edges through sensors.

In some embodiments, the pipeline network diagnosis model 420 may be a machine learning model or other neural network models, such as a Graph Neural Networks (GNN) model, etc.

In some embodiments, an input of the pipeline network diagnosis model 420 may include the accuracy diagnosis map and an output may include the second accuracy risk of at least one node.

In some embodiments, the node may include a master node and at least one branch node. The master node represents the metering device on a main pipeline and the branch node represents the metering device on a branch pipeline. In some embodiments, if the metering accuracy of all metering devices meets the requirements, the flow rate monitoring data and the pressure monitoring data of the metering devices are equal to or approximate a sum of the flow rate monitoring data and the pressure monitoring data of their branch nodes, respectively.

It should be noted that flow rate monitoring data and pressure monitoring data corresponding to each branch node are different, and the second accuracy risks of the metering devices corresponding to different nodes are different.

In some embodiments, the greater a frequency and magnitude of changes of the flow rate monitoring data and the pressure monitoring data, the higher the second accuracy risk output by the pipeline network diagnosis model, i.e., the greater the possibility of the metering accuracy of the metering device not meeting the requirements.

In some embodiments, the pipeline network diagnosis model may be obtained by training a third training sample with a large number of third labels.

In some embodiments, the third training sample includes a sample accuracy diagnosis map. The third training sample may be acquired based on preset graph structure data according to historical data. The third label represents an accuracy diagnosis map in which nodes are labeled with 0 or 1. The third label represents whether accuracy problems occur in a nodal metering device corresponding to the accuracy diagnosis map in the third training sample, which may be acquired by automatic labeling based on historical data. A node labeled with 0 indicates that the measuring device of the node does not have accuracy issues, while a node labeled with 1 indicates that the measuring device of the node has accuracy issues. The third label may be determined through on-site detection of the measuring devices. The training of the pipeline network diagnosis model may be seen in the training of the flow prediction model described above.

The smart gas device management platform may understand the relationship between each metering device in a more intuitive way by inputting the accuracy diagnostic map into the accuracy diagnostic pipeline network diagnostic model, and obtain the second accuracy risk of at least one metering device in the gas area by inputting the accuracy diagnostic map into the pipeline network diagnostic model. In this way, the metering device with the second accuracy risk can be more accurately identified, which is conducive to a subsequent display of detection indication information to the smart gas device management platform based on a result of precision diagnosis. Consequently, the accuracy of the measuring devices can be ensured, and the overall safety of operations of the gas pipelines can be improved.

Some embodiments of the present disclosure also include a non-transitory computer-readable storage medium that stores computer instructions, and when a computer reads the computer instructions in the storage medium, the computer implements the method for diagnosing accuracy of the smart gas ultrasonic meter described above.

The basic concepts have been described above, and it is clear that the above detailed disclosure is intended as an example only for those skilled in the art and does not constitute a limitation of the present disclosure. Although not explicitly stated herein, there are various modifications, improvements, and amendments that may be made to the present disclosure by those skilled in the art. Such modifications, improvements, and amendments are suggested in the present disclosure, so such modifications, improvements, and amendments remain within the spirit and scope of the exemplary embodiments of the present disclosure.

Finally, it should be understood that the embodiments described in the present disclosure are used only to illustrate the principles of the embodiments of the present disclosure. Other variations may also fall within the scope of the present disclosure. Thus, by way of example and not limitation, alternative configurations of embodiments of the present disclosure may be considered consistent with the teachings of the present disclosure. Accordingly, the embodiments of the present disclosure are not limited to the embodiments explicitly introduced and described in the present disclosure.

What is claimed is:

1. A method for diagnosing accuracy of a smart gas ultrasonic meter, wherein the method is implemented by a smart gas device management platform of an Internet of Things (IoT) system for diagnosing accuracy of the smart gas ultrasonic meter, and the method comprises:
acquiring gas attribute data of gas passing through a metering device based on a distributed sensor deployed in a gas pipeline network, wherein the gas attribute data includes gas density, composition and mass, fluid pulsation, and flow rate profile;
determining a first accuracy risk of the metering device through performing pre-diagnosis on the metering device based on the gas attribute data and metering device information, wherein the metering device information includes a type, a service life, and a location, and the first accuracy risk refers to a pre-diagnosed possible abnormal metering device and an abnormal possibility thereof, wherein
the determining a first accuracy risk of the metering device through performing pre-diagnosis on the metering device based on the gas attribute data and metering device information includes:
predicting a predicted gas flow of at least one point in a gas pipeline in a future period based on historical gas monitoring data;
determining a suspect metering device based on the predicted gas flow and gas monitoring data of the metering device; and
evaluating the first accuracy risk of the suspect metering device based on the gas attribute data and the metering device information:
determining a second accuracy risk of the metering device through performing precision diagnosis on the metering device based on a pre-diagnosis result, wherein the second accuracy risk refers to a possibility of accuracy abnormality of the possible abnormal metering device, wherein
the determining a second accuracy risk of the metering device through performing precision diagnosis on the metering device based on a ore-diagnosis result includes:
in response to the first accuracy risk of at least one metering device satisfying a preset risk condition, evaluating the second accuracy risk of the at least one metering device in a gas area based on the first accuracy risk and the gas monitoring data, wherein the preset risk condition refers to a count of metering devices with the first accuracy risk exceeding a first risk threshold reaching a quantity alert value, and the first risk threshold is related to a data monitoring frequency of the metering device, wherein
the in response to the first accuracy risk of at least one metering device satisfying a preset risk condition, evaluating the second accuracy risk of the at least one metering device in a gas area based on the first accuracy risk and the gas monitoring data includes:
constructing an accuracy diagnosis map based on the metering device in the gas area, wherein nodes of the accuracy diagnosis map include the metering device, edges of the accuracy diagnosis map include gas pipelines between the nodes, attributes of the nodes include types of the metering devices, locations of the nodes in the gas pipeline network, the gas monitoring data, gas theoretical data, the first accuracy risk, flow rate monitoring data, pressure monitoring data, and historical calibration records corresponding to the metering devices; and
determining, based on the accuracy diagnosis map, the second accuracy risk of the at least one metering device in the gas area through a pipeline network diagnosis model, the pipeline network diagnosis model being a machine learning model; and
displaying detection indication information to the smart gas device management platform based on a precision diagnosis result.

2. The method according to claim 1, wherein the evaluating the first accuracy risk of the suspect metering device based on the gas attribute data and the metering device information includes:
evaluating the first accuracy risk of the suspect metering device through an accuracy risk evaluation model based on the gas attribute data, the metering device information, and a change feature of the predicted gas flow, the accuracy risk evaluation model being a machine learning model.

3. An Internet of Things (IoT) system for diagnosing accuracy of a smart gas ultrasonic meter, wherein the system comprises a smart gas user platform, a smart gas service platform, a smart gas device management platform, a smart gas sensing network platform, and a smart gas object platform;
the smart gas user platform includes a plurality of smart gas user sub-platforms;
the smart gas service platform includes a plurality of smart gas service sub-platforms;
the smart gas device management platform includes a plurality of smart gas device management sub-platforms and a smart gas data center;
the smart gas sensing network platform is configured to interact with the smart gas data center and the smart gas object platform;
the smart gas object platform is configured to acquire gas attribute data of gas passing through a metering device based on a distributed sensor deployed in a gas pipeline network, wherein the gas attribute data includes gas density, composition and mass, fluid pulsation, and flow rate profile;
the smart gas device management platform is configured to:
determine a first accuracy risk of the metering device through performing pre-diagnosis on the metering device based on the gas attribute data and metering device information, wherein the metering device information includes a type, a service life and a location, and the first accuracy risk refers to a pre-diagnosed possible abnormal metering device and an abnormal possibility thereof;
the smart gas device management platform is further configured to:
predict a predicted gas flow of at least one point in a gas pipeline in a future period based on historical gas monitoring data;
determine a suspect metering device based on the predicted gas flow and gas monitoring data of the metering device; and
evaluate the first accuracy risk of the suspect metering device based on the gas attribute data and the metering device information:

determine a second accuracy risk of the metering device through performing precision diagnosis on the metering device based on a pre-diagnosis result, wherein the second accuracy risk refers to a possibility of accuracy abnormality of the possible abnormal metering device;

the smart gas device management platform is further configured to:
  in response to the first accuracy risk of at least one metering device satisfying a preset risk condition, evaluate the second accuracy risk of the at least one metering device in a gas area based on the first accuracy risk and the gas monitoring data, wherein the preset risk condition refers to a count of metering devices with the first accuracy risk exceeding a first risk threshold reaching a quantity alert value, and the first risk threshold is related to a data monitoring frequency of the metering device:

the smart gas device management platform is further configured to:
  construct an accuracy diagnosis map based on the metering device in the gas area, wherein nodes of the accuracy diagnosis map include the metering device, edges of the accuracy diagnosis map include gas pipelines between the nodes, attributes of the nodes include types of the metering devices, locations of the nodes in the gas pipeline network, the gas monitoring data, gas theoretical data, the first accuracy risk, flow rate monitoring data, pressure monitoring data, and historical calibration records corresponding to the metering devices; and
  determine, based on the accuracy diagnosis map, the second accuracy risk of the at least one metering device in the gas area through a pipeline network diagnosis model, the pipeline network diagnosis model being a machine learning model;

display detection indication information to the smart gas device management platform based on a precision diagnosis result; and transmit the detection indication information to the smart gas service platform through the smart gas data center; and the smart gas service platform is configured to upload the detection indication information to the smart gas user platform.

4. The system according to claim 3, wherein the smart gas device management platform is further configured to:
  evaluate the first accuracy risk of the suspect metering device through an accuracy risk evaluation model based on the gas attribute data, the metering device information, and a change feature of the predicted gas flow, the accuracy risk evaluation model being a machine learning model.

* * * * *